Sept. 15, 1970 W. FEINGOLD 3,529,175
TIMER OPERATED TUNING DEVICE
Filed Dec. 16, 1968
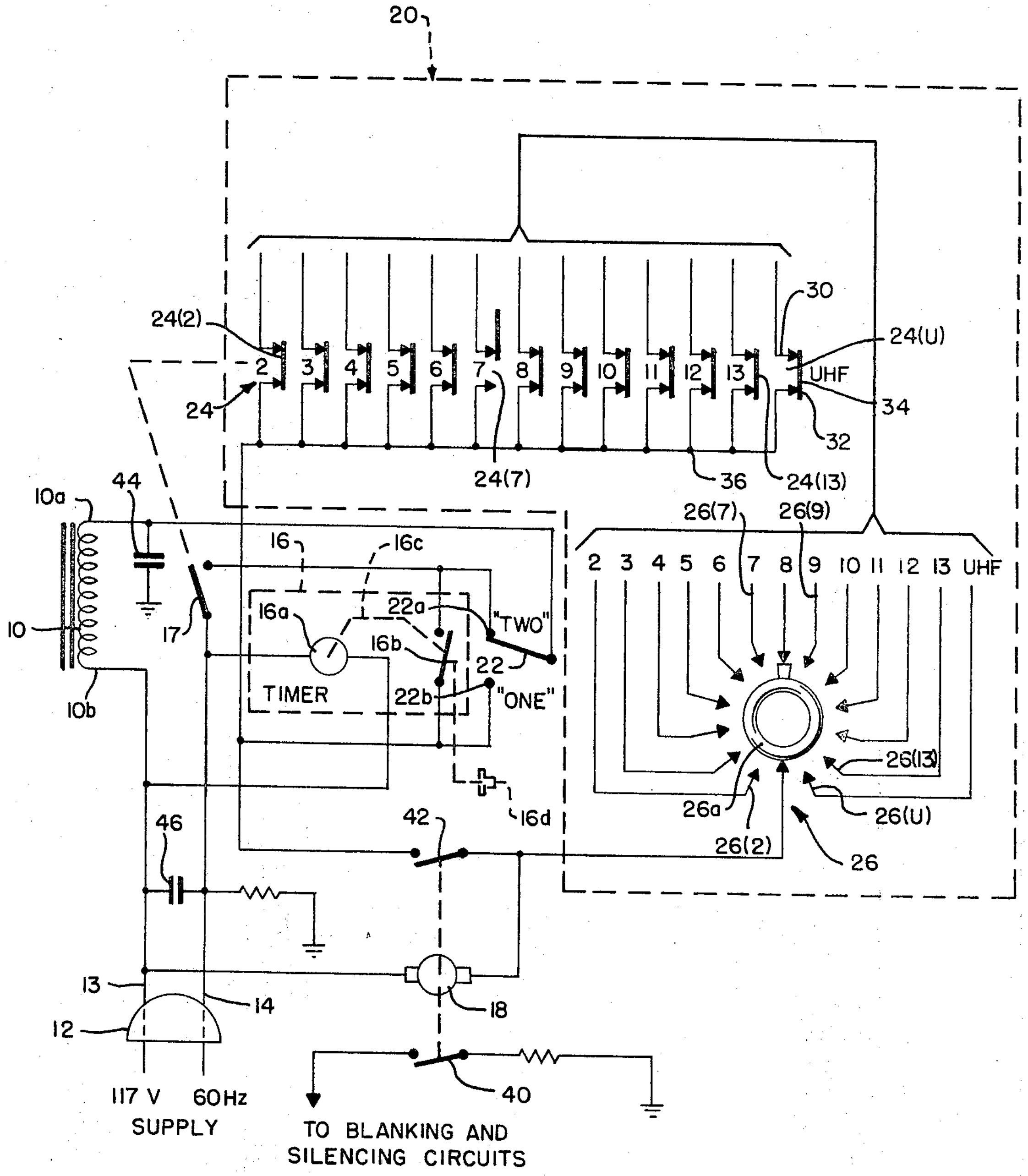
INVENTOR
WILLIAM FEINGOLD
BY Darby & Darby
ATTORNEYS United States Patent Office 3,529,175
Patented Sept. 15, 1970

3,529,175

TIMER OPERATED TUNING DEVICE

William Feingold, Fresh Meadows, N.Y., assignor to Andrea Radio Corporation, Long Island City, N.Y., a corporation of New York Filed Dec. 16, 1968, Ser. No. 784,059
Int. Cl. H04b 1/06
U.S. Cl. 307—141.8 9 Claims

ABSTRACT OF THE DISCLOSURE

A timer operated device for tuning a television receiver, or the like, to a specified channel at a desired time, or, alternatively, for switching from a first to a second channel at a preselected time. The device includes a bank of push button switches corresponding to the individual channels, each switch being interlocked with a power switch, and a tuner motor which is controlled by the switch bank to select the channel corresponding to a depressed push button. An automatic timer includes a normally open switch connected in the circuit with a mode selection switch such that in one position ("one channel" operation) of the mode selection switch, the timer contacts serve to connect the primary of the power transformer across a power line, while in a second position ("two channel" operation), the timer contacts are bypassed. In the first mode switch position, the timer contacts are connected in the energizing circuit for the tuner motor through the mode selection switch; in the second switch position, the mode selection switch is bypassed by the motor energizing circuit.

This invention relates to a timer operated device for tuning television receivers or the like.

The present invention provides a timer controlled device which enables a television receiver or the like to be turned on to a desired channel at a preselected time and which also may be used to change channels at a given time. The device is relatively simple and inexpensive to manufacture, and can be incorporated in standard receivers without substantial modification thereof. An important advantage of the invention is that it enables use of standard commercially available timer mechanisms, having a single timer switch, to provide two distinct tuning operations.

Briefly, in accordance with the invention, a timer controlled device for controlling a television receiver or the like, includes a tuner motor for positioning the receiver tuning means in response to a manually operable frequency selector mechanism, and timer means including a pair of contacts which may be connected in a circuit with the tuner motor and in a circuit with the on-off line of the receiver by a mode selection switch. The circuits are such that the receiver can be turned "on" (or "off") at a preselected time or, alternatively, the receiver can be manually turned on to a selected channel and thereafter, at a preselected time, automatically tuned to a second selected channel.

The manner in which the objects of the invention are accomplished is fully described below with reference to the attached drawing which is a schematic diagram of a preferred embodiment of the invention.

It will become apparent that the invention is not restricted to a particular type of receiver. For purposes of convenience only, the following detailed description relates to use of the invention to select a channel for an ordinary television receiver, and the drawing illustrates only that portion of a television receiver which is germane to the present invention. As such, only the primary winding 10 of the receiver's power transformer is illustrated, with the tuning device of the subject invention being electronically connected between an outlet plug 12 and the transformer primary 10. The outlet plug 12 is adapted to be inserted into the usual 117 volt, 60 Hz. voltage available at an ordinary wall outlet, and to apply this voltage across the two conductors 13 and 14, of a receiver input power line.

The invention includes a timer 16, a power switch 17, a tuner-drive motor 18, a channel selector mechanism 20, and a mode selection switch 22. As explained below, the channel selector mechanism 20 also serves as the "on-off" switch for the receiver. All of these components are preferably mounted on the cabinet (not shown) in which the television receiver is house.

The timer 16 includes a motor 16*a* and a normally open single pole, single throw switch 16*b* which is operated and can be closed by the motor 16*a* at a preselected time as determined by the user of the receiver by setting the timer. Devices such as timer 16 are conventional and, for example, may include a clock operated by the timer motor 16*a* and a mechanical linkage (diagrammatically shown by dashed line 16*c*) adapted to close switch 16*b* upon expiration of a time interval selected by a manual adjustment of a timer control (not shown) on the exterior of the receiver cabinet. Obviously, numerous devices of this type can be employed as the timer 16 of the invention. The timer used in the preferred embodiment was manufactured by the Telechron Division of General Electric Company under the model No. Z612.

The channel selector mechanism 20 includes a bank of push button operated switches 24 and a rotary switch 26 operable under the control of the tuner motor 18. Switch 26 can be, for example, a deck added to the multideck switch of a conventional television tuner mechanism. The push button switch bank 24 includes thirteen separate push button actuators (accessible from the receiver control panel), corresponding to the twelve respective very high frequency (VHF) television channels and one corresponding to the entire ultra high frequency (UHF) band. In the drawing, the individual push button switches are indicated as 24(2)–24(13) and 24(U). The push button switches are identical and mechanically interlocked so that only one may be depressed at a time. Each switch includes two stationary contacts 30 and 32 normally closed by a movable bar 34 which is moved when a respective push button actuator is manually depressed to open the circuit between the contacts 30 and 32. Each of the contacts 32 of the push button switch bank 24 is electrically connected to a common junction 36.

The main power switch 17 for the receiver is located in the conductor line 14. It may also be of the push button type with its actuator being accessible from the receiver control panel to permit the receiver to be manually turned "off." Each switch of bank 24 is mechanically interlocked, as shown by the dotted line, with power switch 17 so that switch 17 is closed when any one of the switches 24(2)–24(13), 24(U) is actuated (that is moved to an open condition), and the switches 24 are closed when switch 17 is actuated (i.e. opened).

The rotary switch 26 includes thirteen stationary contacts 26(2)–26(13) and 26(U) each of which is directly connected to a respective contact 30 of the push button switches 24(2)–24(13) and 24(U). The switch 26 also includes a rotary armature 26*a* which is rotated by the tuner motor 18 and is adapted to sequentially contact each of the stationary contacts 26(2)–26(13) and 26(U) as the tuner motor 18 drives the multi-bank switch of the tuner.

The mode selection switch 22 is a single pole, double throw switch having a first terminal or contact 22*a* corresponding to a first or "two channel" operating mode and a second contact 22*b* corresponding to a second or "one channel" mode of operation. Contacts 22a and 22b are connected across the fixed contacts of the timer switch 16b so that switch 16b can be selectively connected between the top 10a of transformer primary 10 and the right conductor 14 of the input power line by the armature of switch 22, as explained below.

In addition to the foregoing, the circuit may also include a switch 40 and a tuner detent switch 42, both of which are actuated by the tuner motor 18. These switches do not actually comprise a portion of the present invention and are illustrated only for the sake of completeness. The switch 40 serves to electrically blank the face of the receiver cathode ray tube and silence the audio portion of the program during the operation of the tuner motor. The tuner detent switch 42 is a standard device which guarantees that the motor 18 will remain energized until the detent arrangement which "pulls" the armature 26a into each of the thirteen different positions has arrived sufficiently close to the desired position (typically plus or minus five degrees) to permit the mechanical operation of the detent mechanism to take effect. Also a pair of RF bypass capacitors 44 and 46 are connected to both sides of the primary 10 of the power transformer to bypass any RF signals to ground. These capacitors can be ignored for purposes of the following discussion.

The operation of the circuit shown in the drawing is explained below by reference to particular examples. Thus, for a first example, assume it is desired to turn the receiver on at a selected time to channel 7. To accomplish this, the user first places the mode selection switch 22 to terminal 22b (the "one channel" position). The timer 16 is then set to the desired time interval which opens the contacts 16b as illustrated. Finally, the user pushes the push button switch 24(7) opening this switch as illustrated and closing the power switch 17. Further, for purposes of explanation, assume that the switch armature 26a is in contact with the terminal 26(9) and that the armature 26a is rotated in a counter-clockwise direction by motor 18.

The bottom 10b of the primary 10 of the power transformer is always directly connected to the left conductor 13 of the power line. To turn the television receiver "on," it is necessary to connect the top 10a of primary 10 to the right conductor 14 of the power line. (In this context, the point 10a may be considered as an "on-off line" for the receiver.) When the mode selection switch 22 is in the "one channel" position 22b, the top of the primary 10 can only be connected to the right side 14 of the power line through the series connection of both the timer switch 16b and the power switch 17. Hence, when timer 16 closes switch 16b at the selected time, the receiver is turned "on" in the example as stated above since switch 17 was closed by the actuation of push button switch 24(7).

Concurrently with the connection of transformer primary 10 across the power line 13, 14, a circuit is completed to the tuner motor 18 from the left side 13 of the power line through armature 26a, terminal 26(9), closed push button switch 24(9), common junction 36, closed timer contact 16b, back to the right side 14 of the power line through closed power switch 17. This completes the energizing circuit for the tuner motor 18 causing it to rotate the armature 26a in a counter-clockwise direction. When contact is made between armature 26a and terminal 26(8), the circuit to the tuner motor 18 remains closed and it continues to operate. However, when the armature 26a contacts terminal 26(7), the energizing circuit for motor 18 is opened by the open push button switch 24(7). Hence, the channel selection operation ceases with the desired channel 7 having been selected and the receiver "on."

With respect to the "two channel" operation, assume that it is desired to view channel 7 and then automatically transfer to channel 9 at a predetermined time. In this case, the mode selection switch 22 is first placed in the "one channel" position 22b. The timer is turned "on" manually by means, illustrated as a push button 16d, which closes the timer switch 16b. The channel 7 push button 24(7) is then pushed, turning the receiver "on" and causing the channel 7 selection to occur immediately as described above (through timer switch 16b). After the tuner motor 18 has positioned the receiver tuner in the channel 7 position, the mode selection switch 22 is transferred to the "two channel" position 22a. The timer 16 is then set to the time when it is desired to transfer to channel 9. This opens switch 16b. The second channel button 24(9) is then pushed. Because the timer switch 16b has been opened, depression of the push button 24(9) does not operate to actuate the tuner motor 18 since its energizing circuit (as described above) can no longer be completed.

When the mode selection switch 22 is placed in the "two channel" position 22a, the top 10a of transformer primary 10 is connected to the right side 14 of the power line through the mode selection switch 22 and power switch 17. This maintains the television receiver "on" even though the prior path (in the "one channel" mode) to the primary is interrupted by the open timer switch 16b. In the "two channel" mode, the timer switch 16b is removed from the "on-off" circuit for the receiver by the mode selection switch 22.

At the preselected time chosen by the user, the timer switch 16b closes thus energizing the tuner motor 18 through the same circuit described above. The tuner motor 18 operates until armature 26a contacts terminal 26(9) at which point the energizing circuit to the motor 18 is broken. In this condition, the receiver is tuned to channel 9, as desired.

The circuit may also be used to turn the receiver "off" at a preselected time. For this purpose, it is necessary that the timer motor 16a open (instead of close) the timer switch 16b at the chosen time (for example, by rotation of the timer control member in a second direction). This capability is included in the preferred timer referred to above. Thus, with mode selection switch 22 in the "one channel" position, and the receiver "on" through closed timer switch 16b and mode selection switch 22, the timed opening of switch 16b will open the circuit between the top 10b of primary 10 and the right side 14 of the power line to turn the receiver "off."

The invention will have utility with tunable electronic devices other than receivers in general and, of course, television receivers in particular. Generally, the invention could be used to control any tunable electronic device having a plurality of discrete tuner positions (corresponding to the television channels referred to herein). Similarly, the specific form of the switches employed is not critical although the illustrated arrangement of individual push button switches is preferred inasmuch as the receiver can be turned "on" and the desired channel selected by actuating a single switch. Various other modifications of the invention will also be obvious to those skilled in the art.

What is claimed is:

1. A timer controlled device for controlling electrical apparatus having a tuner with a plurality of discrete switching positions and an on-off line adapted to turn the apparatus "on" when it is connected to one of the two sides of a power line, comprising timer means including a normally open switch, said timer means including means for closing said switch at any preselected time, mode selection switch means including first and second contacts and a common terminal which is selectively electrically connectable to either of said contacts, a tuner drive motor for sequentially positioning the tuner means of said receiver to said discrete switching positions, frequency selection switch means connected in a tuner circuit with said tuner drive motor for controlling the operation of said motor, and means connecting said timer switch and mode selection switch with (a) said timer switch being in said tuner circuit regardless of the position of said mode selection switch, (b) said timer switch being connected in series between said on-off line and said one side of said power line when the common terminal of said mode selection switch is connected to said first contact, and (c) said on-off line being connected to said one side of the power line when said common terminal is connected to said second contact.

2. A timer controlled device according to claim 1, wherein said timer switch and mode selection switch are connected in series in said tuner circuit when said mode selection switch is connected to said second contact.

3. A timer operated device according to claim 1, wherein said frequency selection switch means comprises a bank of normally closed push button switches and a rotary switch, said rotary switch including a plurality of stationary contacts and an armature adapted to be rotated by said tuner motor into contact with one of said stationary terminals, there being a single push button switch corresponding to each of the individual tuner positions, one contact of each push button switch being connected to a common junction, a second contact of each of said push button switches being connected to a respective stationary terminal of said rotary switch, said common junction being connected to one side of said timer switch, the energizing circuit for said tuner motor being connected to said armature.

4. A timer operated device according to claim 1, wherein said common junction is connected to one side of said timer switch, said timer switch is connected in parallel with said first and second contacts of said mode selection switch, said common terminal is connected to said on-off line, and said one side of the power line is connected to the other side of said timer switch.

5. A timer operated device according to claim 3, including a power switch mechanically interlocked with each of said push button switches, said power switch being connected in series with said on-off line in either position of said mode selection switch.

6. A timer device according to claim 5, wherein said common junction is adapted to be connected to said one side of the power line by said timer switch to connect said tuner motor in circuit across the two sides of the power line.

7. A timer eperated device according to claim 6, wherein said common junction is connected to one side of said timer switch, said timer switch is connected in parallel with said first and second contacts of said mode selection switch, said common terminal is connected to said on-off line, and said one side of the power line is connected to the other side of said timer switch.

8. A timer operated device according to claim 2, wherein said frequency selection switch means comprises a bank of normally closed push button switches and a rotary switch, said rotary switch including a plurality of stationary contacts and an armature adapted to be rotated by said tuner motor into contact with one of said stationary terminals, there being a single push button switch corresponding to each of the individual tuner positions, one contact of each push button switch being connected to a common junction, a second contact of each of said push button switches being connected to a respective stationary terminal of said rotary switch, said common junction being connected to one side of said timer switch, the energizing circuit for said tuner motor being connected to said armature.

9. A timer operated device according to claim 2, wherein said common junction is connected to one side of said timer switch, said timer switch is connected in parallel with said first and second contacts of said mode selection switch, said common terminal is connected to said on-off line, and said one side of the power line is connected to the other side of said timer switch.

References Cited

UNITED STATES PATENTS

| | | | |
|---|---|---|---|
| 2,045,091 | 6/1936 | McLaughlin | 307—141 X |
| 2,221,544 | 11/1940 | Johnson | 307—141 |
| 3,027,506 | 3/1962 | Stenhammar et al. | 307—141.8 X |
| 3,054,038 | 9/1962 | Rast et al. | 307—141 X |

T. B. JOIKE, Assistant Examiner

HERMAN O. JONES, Primary Examiner

U.S. Cl. X.R.

325—396